US008689227B2

(12) United States Patent
Blanding et al.

(10) Patent No.: US 8,689,227 B2
(45) Date of Patent: Apr. 1, 2014

(54) SYSTEM AND METHOD FOR INTEGRATING CAPACITY PLANNING AND WORKLOAD MANAGEMENT

(75) Inventors: William H Blanding, Bow, NH (US); Wade J Satterfield, Fort Collins, CO (US); Dan Herington, Dallas, TX (US); Michael R Stabnow, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 172 days.

(21) Appl. No.: 13/145,544

(22) PCT Filed: Jan. 30, 2009

(86) PCT No.: PCT/US2009/032633
§ 371 (c)(1),
(2), (4) Date: Aug. 31, 2011

(87) PCT Pub. No.: WO2010/087850
PCT Pub. Date: Aug. 5, 2010

(65) Prior Publication Data
US 2011/0307901 A1    Dec. 15, 2011

(51) Int. Cl.
*G06F 9/46*           (2006.01)
(52) U.S. Cl.
USPC ........................................................ 718/104
(58) Field of Classification Search
USPC ........................................................ 718/104
See application file for complete search history.

(56) References Cited

U.S. PATENT DOCUMENTS

| 8,301,742 | B2* | 10/2012 | Hanson et al. ................. 709/223 |
| 2003/0097393 | A1* | 5/2003 | Kawamoto et al. ............... 709/1 |
| 2003/0115244 | A1* | 6/2003 | Molloy et al. ................. 709/105 |
| 2005/0222885 | A1* | 10/2005 | Chen et al. ......................... 705/8 |
| 2006/0136928 | A1* | 6/2006 | Crawford et al. ............. 718/105 |
| 2007/0078960 | A1* | 4/2007 | Dawson et al. ............... 709/223 |
| 2008/0022282 | A1 | 1/2008 | Cherkasova et al. |
| 2012/0324451 | A1* | 12/2012 | Ding et al. ........................ 718/1 |
| 2013/0007744 | A1* | 1/2013 | Arasaratnam .................... 718/1 |

FOREIGN PATENT DOCUMENTS

| JP | 2005-099973 | 4/2005 |
| JP | 2008-171234 | 7/2008 |

* cited by examiner

*Primary Examiner* — Emerson Puente
*Assistant Examiner* — Charlie Sun

(57) ABSTRACT

A system for integrating resource capacity planning and workload management, implemented as programming on a suitable computing device, includes a simulation module that receives data related to execution of the workloads, resource types, numbers, and capacities, and generates one or more possible resource configuration options; a modeling module that receives the resource configuration options and determines, based on one or more specified criteria, one or more projected resource allocations among the workloads; and a communications module that receives the projected resource allocations and presents the projected resource allocations for review by a user.

18 Claims, 6 Drawing Sheets

SYSTEM AND METHOD FOR INTEGRATING CAPACITY PLANNING AND WORKLOAD MANAGEMENT

TECHNICAL FIELD

The technical field is computer resource capacity planning and workload management.

BACKGROUND

A computer system may employ resources, such as processors, so as to support one or more workloads executing on the computer system. To monitor and control allocation and operation of these resources, the computer system may have installed a capacity planning system and a workload management system. The workload management system may assign or reassign resources so that the workloads executing on the computer system achieve specified performance targets. The capacity planning system may be used for initial and subsequent acquisition planning of the resources that support workload execution. In current computer systems, the workload management system and the capacity planning system are not integrated, and this lack of integration inherently detracts front the overall efficient operation of the computer system.

SUMMARY

A system for integrating resource capacity planning and workload management, where the system is implemented as programming on a suitable computing device, includes a simulation module that receives data related to execution of the workloads, resource types, numbers, and capacities, and generates one or more possible resource configuration options; a modeling module that receives the resource configuration options and determines, based on one or more specified criteria, one or more projected resource allocations among the workloads; and a communications module that receives the projected resource allocations and presents the projected resource allocations for review by a user.

DESCRIPTION OF THE DRAWINGS

The Detailed Description will refer to the following figures in which like numbers refer to like objects, and in which.

DETAILED DESCRIPTION

Figure 1A:
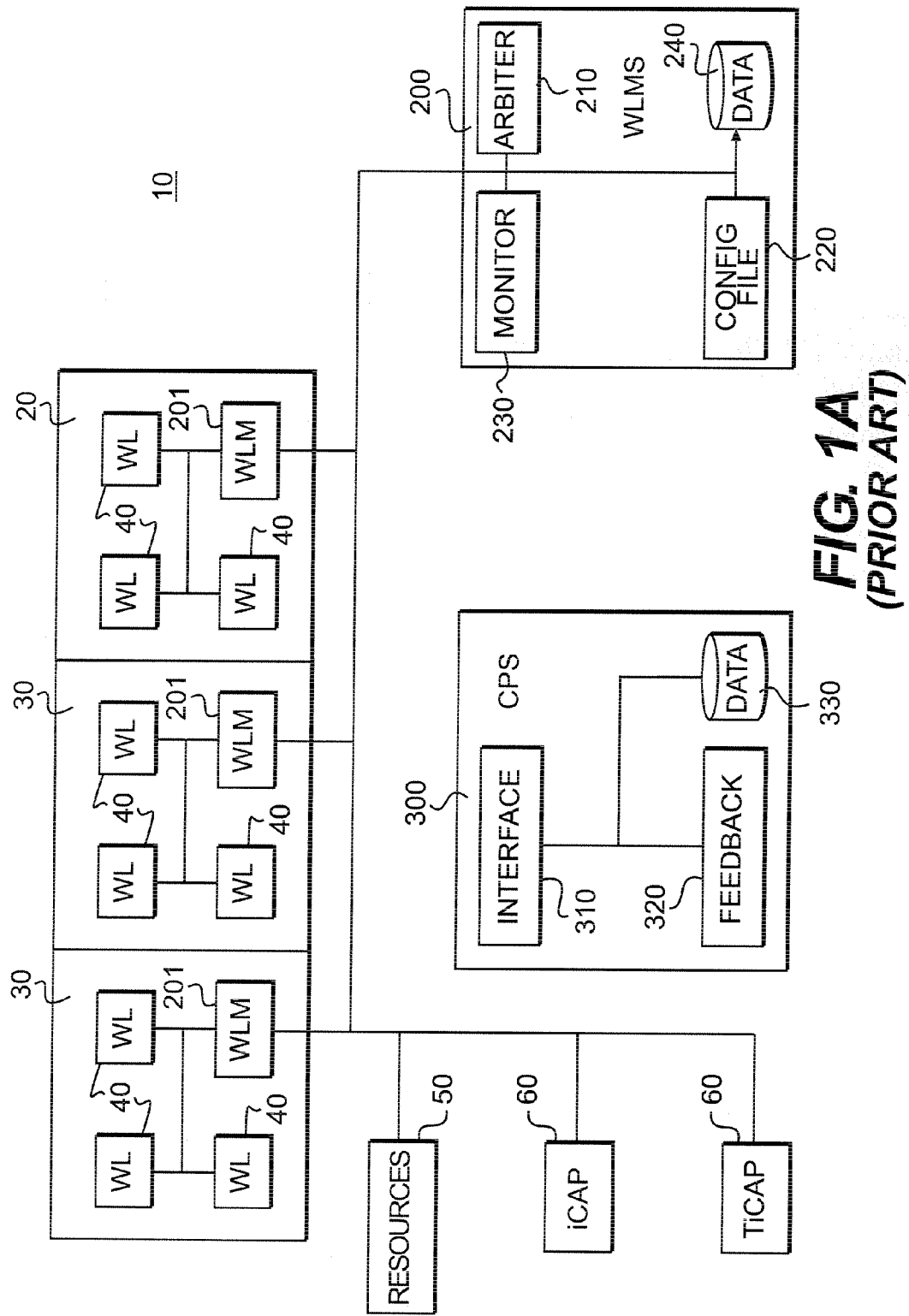
FIG. 1A illustrates a current computer system on which are implemented a workload management system and a capacity planning system.

Workload management functions by monitoring the operation of computing workloads and allocating available resources as appropriate to ensure the workloads meet specified performance objectives. Workload management typically is preformed under control of a workload management system (WLMS).

The WLMS may operate according to one or more policies. For example, a user may establish a policy that workload A is to receive 100 percent of its required resources when workload A is executing during the hours of 8 am to 5 pm. Monday-Friday. To meet this policy, the WLMS may shill resources from other executing workloads, or may activate temporary resources.

In an ideal situation, the resource shifting determined by the WLMS would be executed in an instantaneous fashion. However, in any computer system, resource shifting takes time, and may take a long time, which means delays, which may be significant in terms of computer time, and such delays contribute to inefficiencies in the operation of current WLMS.

Capacity planning refers to the process of determining how much equipment (i.e., resources such as CPUs) are needed to support execution of specific workloads on a computer system. Thus, capacity planning attempts to predict 1) which workloads may effectively share a pool of resources, and 2) what should be the size of the resource pool number of resources) and its configuration (e.g., full-rights resources, temporary capacity resources) in order to satisfy the workloads' future resource demands. Capacity planning typically is performed under control of a capacity planning system (CPS). The CPS may include tools that assist in the capacity planning process, typically by gathering historical data related to operation of the computer systems as currently configured. The gathered historical data then are projected into the future, so that the CPS can provide information as to the future affect of executing specific workloads on the currently-configured computer system. The computer system administrator can use the information provided by the CPS to determine what the computer system's resource pool future size and nature should be, and how specific resources should be arrayed in the computer system.

In current computer systems, the CPS performs its designated functions without any actual consideration of the fact that the WLMS will manage the workloads' resource consumption. More specifically, current CPS at best approximate or make simplifying assumptions about WLMs operations. This simplification of a very complex matter may result in inaccurate capacity planning when the workloads are actually assigned resources by the WLMS. Furthermore, current CPS may not even be "aware" that a WLMS is in use. For example, current CPS may assume that virtual partitions have a single, static size, when in fact such virtual partitions are subject to dynamic changes. This static size assumption causes CPS to oversize the virtual partitions since the CPS may not account for the possibility of changing virtual partitions. Thus, the capacity planning executed by the CPS may be inaccurate because the CPS either inflates required resource capacity to account for lack of knowledge concerning actual resource management, or the CPS underestimates the required resource capacity because the WLMS cannot achieve in practice, the efficiency of resource allocation that the CPS' capacity plans call for.

FIG. 1A illustrates a typical computer system 10 on which are implemented a capacity planning system (CPS) 300 and a workload management system (WLMS) 200. The computer system 10 may include both hard partitions 20 and virtual partitions 30. One or more workloads 40 are executing on the computer system 10, and are supported by fully-licensed resources 50 and, in an embodiment, by instant capacity resources 60.

In current configurations, the WLMS 200 performs many resource monitoring and control functions including allocation of shared resources to workloads. These shared resources include processors, memory, bandwidth, and storage capacity used by a computer system 10. The WLMS 200 includes arbiter 210 that is configurable according to configuration file 220, which is stored in database 240, and may be used to allocate the shared resources. Alternately, the resource allocation may be distributed within individual partitions by implementing individual workload management (WLM) instances 201 for each partition 20/30 in the computer system 10.

The resource allocations may be based on defined service level objectives (SLOs) for each workload, other performance metrics, policies defined for the workloads individually or in groups, and the resource pool defined for the workloads. These definitional qualities usually are made explicitly by the computer system administrator, but in the absence of such explicit definitions, the arbiter 210 may use default settings established as part of the configuration file 220.

The WLMS 200 also includes monitor module 230, which is used to monitor workload execution and resource consumption. The monitor module 230 includes specific tools to perform its designated monitoring functions, including an assignment tool to assign resources to workloads, a monitor tool to monitor workload performance, including SLO status, performance metrics, and resource usage, and a review tool to allow changes to the workload management setup, including the configuration file 220, on the computer system 10.

As can be seen from FIG. 1A, current computer systems do not provide a mechanism to integrate CPS and WLMS functions. In simple terms, with current systems, the computer system administrator employs the CPS to estimate resource demands, typically using historical data, and acquires the resources according to the estimate. The administrator then installs a WLMS, and operates the computer system with the WLMS allocating the acquired resources to the executing workloads. However, because the WLMS and CPS have no communications mechanism, actual WLMS allocations are not factored into the capacity planning process. As an example, the CPS does not take into account the delay imposed by movement of resources from one workload to another workload as a result of operation of the WLMS. With current systems, only the "steady-state" condition of workload execution is available. In reality, as one workload ramps up demand, and another ramps down demand from a first steady state condition at which resource demand equals resource capacity to a second steady state condition at which resource demand equals resource capacity, the overall resource demand may exceed available resources. Thus, the actual allocation of resources often falls short of the theoretically optimal allocation of those resources.

Figure 1B:
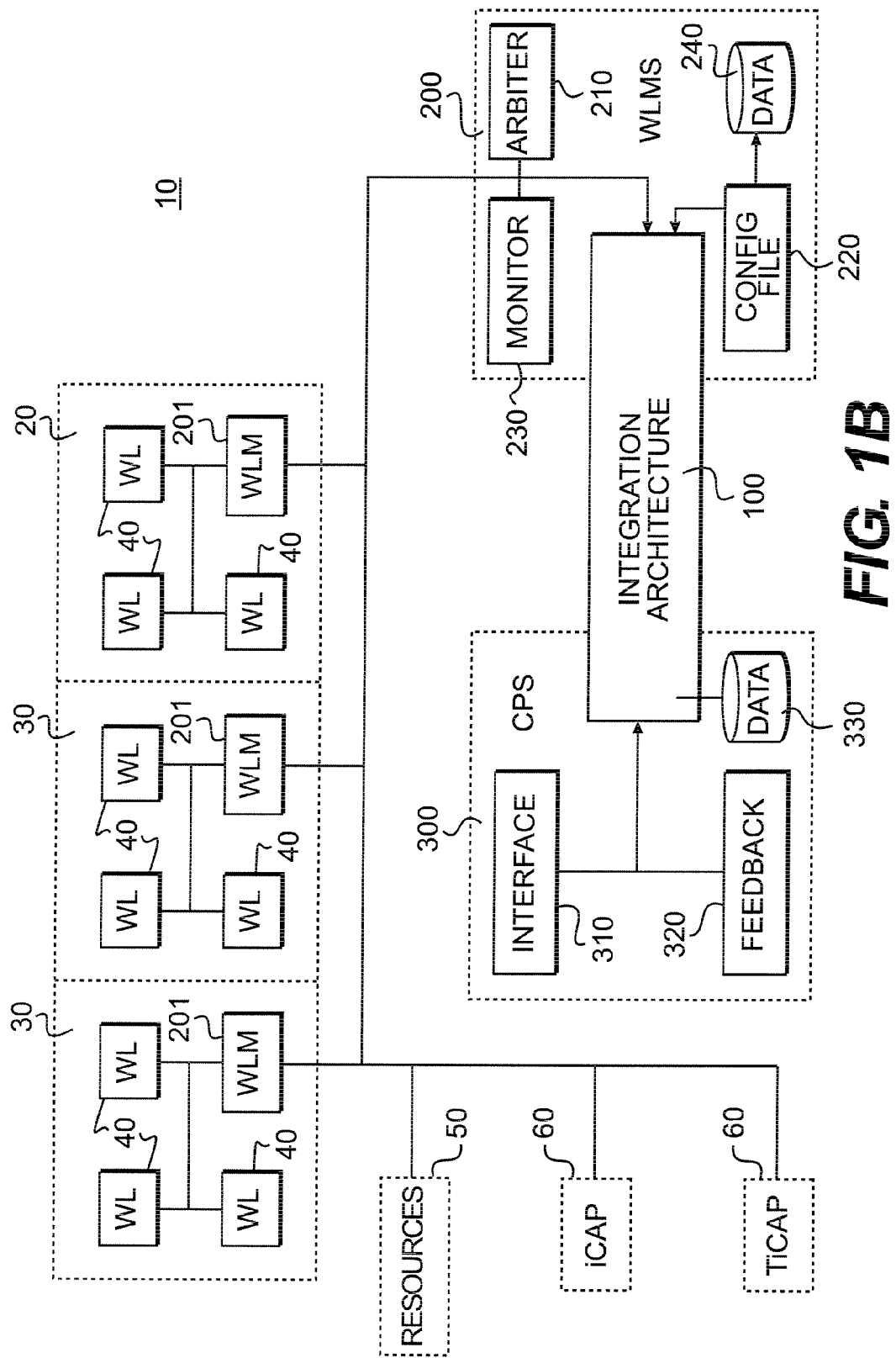
FIG. 1B illustrates a computer system in which an integration architecture is implemented so as to couple workload management and capacity planning functions.

To overcome limitations with current capacity planning and workload management systems, and to more closely match resource planning to resource demand, disclosed herein, and shown in simplified block diagram form in FIG. 1B, is an architecture 100 that integrates the CPS and WLMS so as to couple capacity planning and workload management. The integration architecture 100, along with the WLMS 200 and CPS 300, may be installed on a single platform or computer system. Alternatively, the architecture 100, the WLMS 200 and/or the CPS 300 may be installed on separate machines, and may be used in controlling workloads executing on more than one computing platform. The integration architecture 100 may be implemented as a modification to an existing WLMS, a CPS, or both a CPS and a WLMS. For example, in an exemplary embodiment, a WLMS is modified to permit the CPS to establish a connection to the WLMS. With this connection, a capacity planner, using the CPS, can, among other functions and capabilities: 1) obtain information concerning the policies, resources, and workloads that are available to be managed; 2) establish additional policies, and "imaginary" resource containers and workloads; 3) provide definitions of shared resource domains that reference existing and/or capacity planner-created policies, resource containers, and workloads; and 4) provide sample operating parameters for the workloads/resource containers in the defined shared resource domains and obtain the expected results of workload management of that domain for the given sample operating parameters, exactly as if the WLMS had been managing such a domain and had actually measured the sample values provided. Thus, the herein disclosed integration architecture 100 allows the CPS to pass projected resource demands for workload execution as determined by the CPS to the WLMS, which allows the WLMS, in turn, to determine how, in advance of actual workload execution, the WLMS would manage that workload.

As noted above, CPSs generally work from historical data, and the herein disclosed integration architecture 100 is capable of operating with a CPS using such historical data. However, in an embodiment, the integration architecture can include a simulation process wherein the CPS, instead, of relying on historical data, begins its resource planning function based on a simulation of workload execution on the computer system. Thus, a computer system administrator, for example, could designate, as a model, execution of workloads A-D at various time over a one week period, and the capacity planning system would determine the possible workload characteristics for the modeled workloads A-D. The simulated workload data could then be passed to the WLMS, which would in turn provide a simulation of how the resources would actually be allocated and the workloads managed so that the workloads A-D meet their SLOs, other determined performance metrics, or administrator-determined policies. To facilitate this simulation function, the integration architecture 100 may include a separate connection 231 to the monitor module. Thus, the monitor module receives two inputs: the simulated data used for improved capacity planning, and the normal data monitoring connection.

In yet another alternative, the CPS may use a combination of historical data and modeling to provide a simulated workload distribution to the WLMS so that the WLMS can predict how the associated workloads would be managed.

Figure 2:
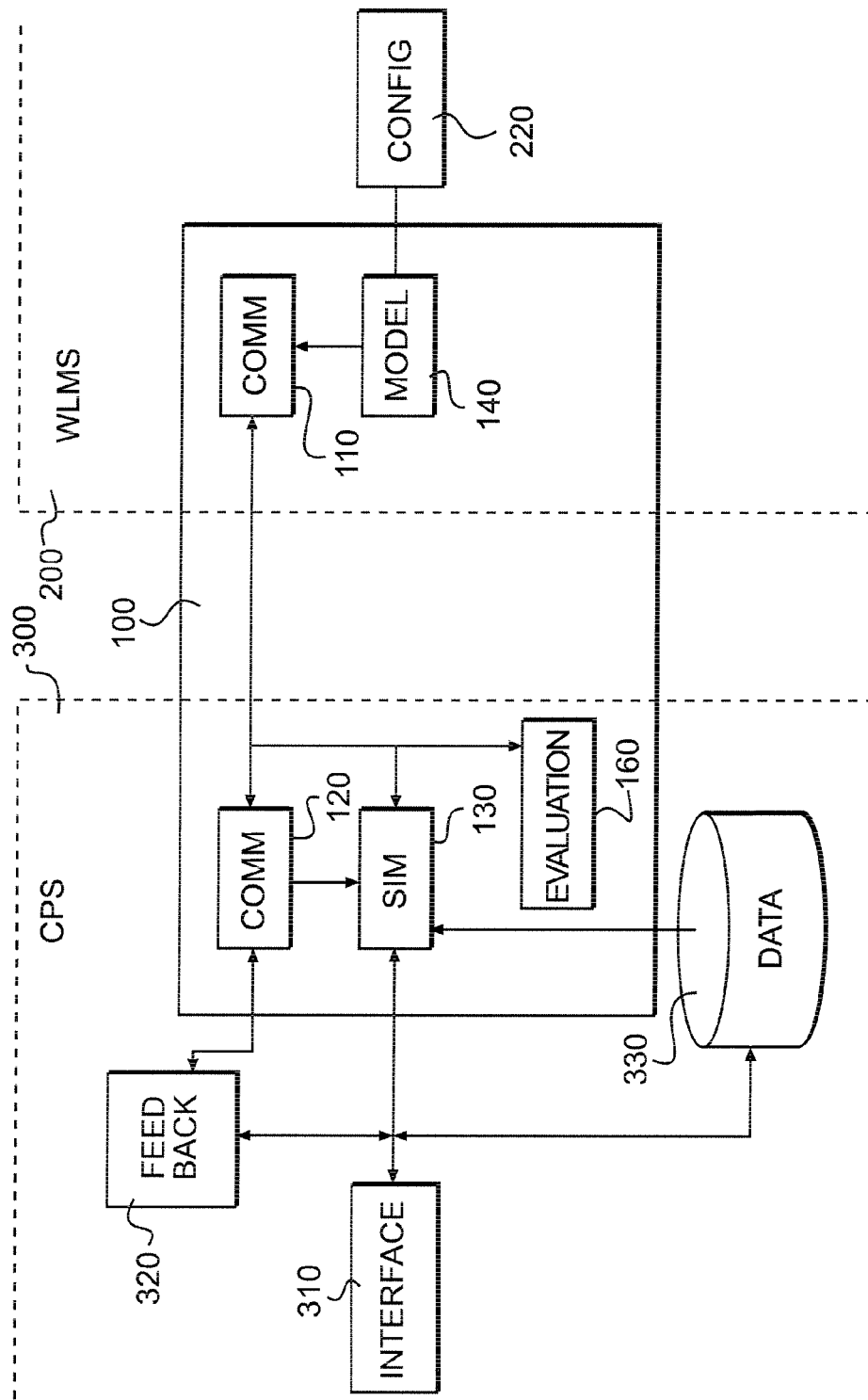
FIG. 2 is an exemplary block diagram of the integration architecture for integrating functions of a capacity planning system and a workload management system.

FIG. 2 is an exemplary block diagram of the integration architecture 100. The integration architecture 100 includes communications modules 110 and 120 for communicating, respectively, with the WLMS 200 and CPS 300. The architecture 100 further includes simulation module 130, which, in an embodiment, is constituted as an addition or modification to the CPS 300 and corresponding modeling module 140, which, in an embodiment, is implemented as an addition or modification to the WLMS 200, and evaluation module 160.

The simulation module 130 receives inputs from other components of the CPS 300. For example, the system administrator may interface with the simulation module 130, using interface 310, to enter forecast or otherwise simulated workload information, including workload identity and type, dates and time of workload execution, unique workload characteristics or demands, SLOs, performance metrics, and other information required to model the resource demands for the workload. Note also that the simulation module 130 may receive workload information for any number of workloads, including workloads expected to execute on the same platform, in the same partition, and at the same dates and times. The simulation module 130 also may receive historical data as to workload execution and corresponding resource allocation from the WLMS 200 by way of the communications modules 110 and 120. Finally, the simulation module 130 may receive historic workload execution and resource allocation data from the CPS 300. With actual historical or simulated workload execution and resource allocation data, or any combination of these data, the simulation module 130 determines what projected resource allocations would be for the stated workload execution data. The simulation module 130 then sends the projected resource allocations and the workload execution data to the modeling module 140.

The modeling module 140 receives the inputs from the simulation module 130 as well as SLOs, performance metrics, and policies, as stated in the configuration file 220. The modeling module 140 uses the inputs and determines a resource allocation plan. The resource plan then is returned to the CPS 300 to feedback module 320. The feedback module 320 formats the received data for display to the computer system administrator, and sends the displayable data to interface 310 where the data may be viewed on the display, or printed. The feedback module 320 also may format the received data for storage and send the thus-formatted data to database 330 for short-term or long-term storage.

The evaluation module 160 is coupled to the simulation module 130 and the communications module 120, and receives projected resource allocation configuration options brined by the modeling module 140. The evaluation module 160 includes evaluation algorithms that are used to analyze the configuration options returned from the WLMS portion of the integration architecture 100 and categorize the configuration options as to desirability. The evaluation option may follow various rules and policies established by the computer system administrator. For example, the computer system administrator may establish that any combined workload sharing that requires a resource allocation of greater than 80 percent has a low desirability, and that a resource allocation of greater than 90 percent is prohibited. The results of the evaluation process are then formatted for presentation to the computer system administrator using the feedback module 320 and interface 310. Should none of the configuration options returned from the WLMS portion of the integration architecture 100 meet a stated threshold value or performance objective, the evaluation module 160 may determine that alternative resource allocation options be considered. This additional determination step then may result in an alert presented to the computer system administrator or in a directive to the simulation module 130 to establish other resource evaluation options, which then, in turn, are communicated to the modeling module 140 and modeled in the WLMS portion of the integration architecture 100.

The evaluation module 160 also may be used, in conjunction with other elements of the CPS 300 to allow determination of policy settings that should be used for actual management of workloads by the WLMS 200. More specifically, the evaluation module 160, in concert with the simulation module 130 may vary policy settings for a same set or group of workloads. With the evaluation module 160 evaluating the results of subsequent modeling by the modeling module 140, and picking one or more sets of policy parameters, based on the desirability rankings, to recommend to the computer system administrator.

The above-disclosed integration architecture 100 also may be used for any type of resource, including full-usage-rights resources (i.e., those for which the computer system administrator has full rights) and limited-usage rights-resources, such as instant capacity (iCAP) and temporary instant capacity (TiCAP) resources (hereafter, instant capacity resources). One method for assigning and for reassigning resources among workloads involves the use of instant capacity resources and associated instant capacity software. Instant capacity resources consist of computer resources (processors, memory) installed in one or more computer system partitions in excess of the necessary usage rights, or licenses, available. Instant capacity software provides the ability to move or reassign the available usage rights so that instant capacity resources may be selectively activated, deactivated and reactivated as necessary to satisfy resource demands in different partitions. Operation of the instant capacity software entails maintaining an accurate record of the licensing state of all partitions, ensuring that actual instant capacity resource activation is compliant with the instant capacity license requirements, and coordinating and synchronizing the reassignment of instant capacity resources among the different partitions. The configuration state of the instant capacity resources will be referred to hereafter as the instant capacity persistent state. A computer system implementing an instant capacity system is considered compliant with its instant capacity license requirements as long as the number of instant capacity resources to be activated is consistent with what the computer system administrator has paid for.

As a result of these operational requirements of the instant capacity software, instant capacity resource assignment/reassignment can be time consuming. Once a new resource allocation has been made, any delays in transferring, resources from lower to higher priority workloads will reduce the effectiveness of workload management and the efficiency of the computer system operations.

For example, when a workload management system is monitoring multiple workloads and decides that an instant capacity processor needs to be used by a first workload as opposed to a second workload, the workload management system may communicate with the instant capacity software responsible for the workload and request that the instant capacity software turn off the instant capacity processor. The instant capacity software then executes this deactivation request. Next, the workload management system requests that the instant capacity software responsible for the second workload activate the previously deactivated processor. The instant, capacity software then reactivates the processor so that it support execution of the second workload.

Figure 3:
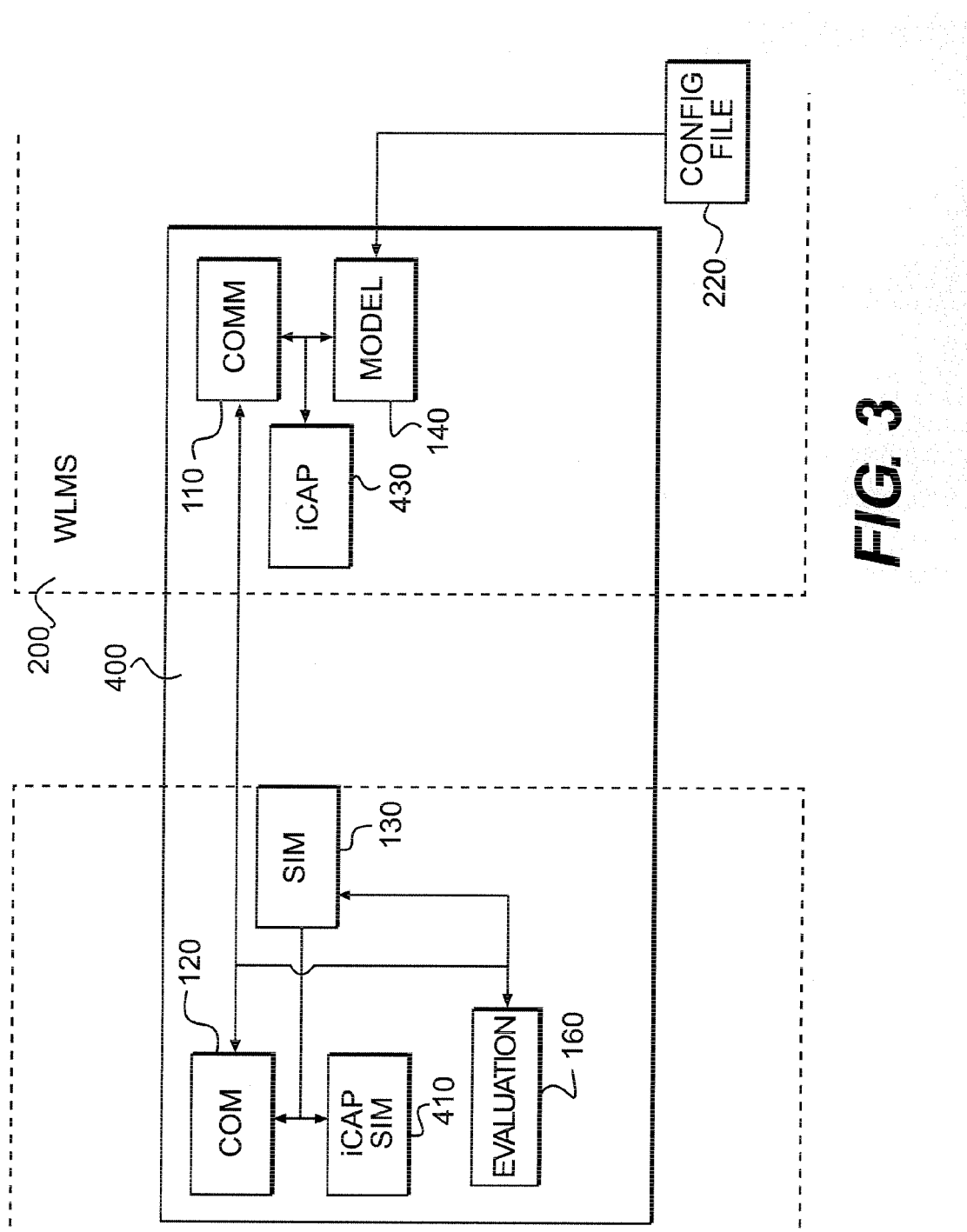
FIG. 3 is an exemplary block diagram of an alternate integration architecture.

FIG. 3 is an exemplary block diagram of an alternate integration architecture 400 that accounts for allocation of instant capacity resources to workloads executing on the computer system, in addition to the elements of the architecture 100, the integration architecture 400 includes a instant capacity module 410 that is used to provide information similar to that of the simulation module 130.

A separate instant capacity control system (not shown) may be responsible for monitoring the state of compliance of the computer system 10 with any implemented instant capacity regimes. Thus, for example, the computer system 10 ma have installed eight instant capacity processors, but the implemented regime may require that no more than four total instant capacity processor be active at any one time. The instant capacity control system has access to this requirement, monitors operation of the computer system 10 to determine compliance with the requirement, and records actual usage of the instant capacity processor for accountability purposes.

The instant capacity simulation module 410 receives inputs from the computer system administrator, where the inputs include various allowed combinations of fully-licensed, iCAP and TiCAP resources, along with built in or administrator assigned costs of the various resources. The computer system administrator also provides policies for use of the instant capacity resources, as well as policies provided for full-licensed resources. Finally, the module 410 receives anticipated resource demand data.

The simulation module 410 uses the above-noted inputs and produces a resource configuration output that includes various combinations of fully-licensed and instant capacity resources. This resource configuration then is provided to the iCAP modeling module 430. The modeling modules 140 and 430 generate a model of WLMS operations using the resource configuration information, along with specified policies and workload data so as to predict the operating results, including the performance of workload management, such as the percent of time that administrator-specified policies were or were not satisfied, and the frequency and amount of instant capacity resource use. With this model calculated, the iCAP modeling module 430 then calculates the monetary costs associated with each possible resource configuration and corresponding demand data combination, taking into account, for example, purchase costs of the resources and costs of consumption of the resources that have a time-based usage charge, such as TiCAP resources. The iCAP modeling module 430 then aggregates the cost and performance data by resource configuration, along with any recommendations, and sends the result to the feedback module for eventual display to the computer system user in support of resource planning activities.

The above disclosed integration architecture 400 provides for more accurate instant capacity planning because the characteristics of the WLMS operation in assigning resources to workloads is accurately reflected in the capacity planning, including planning for acquisition of instant capacity resources.

Figure 4A:
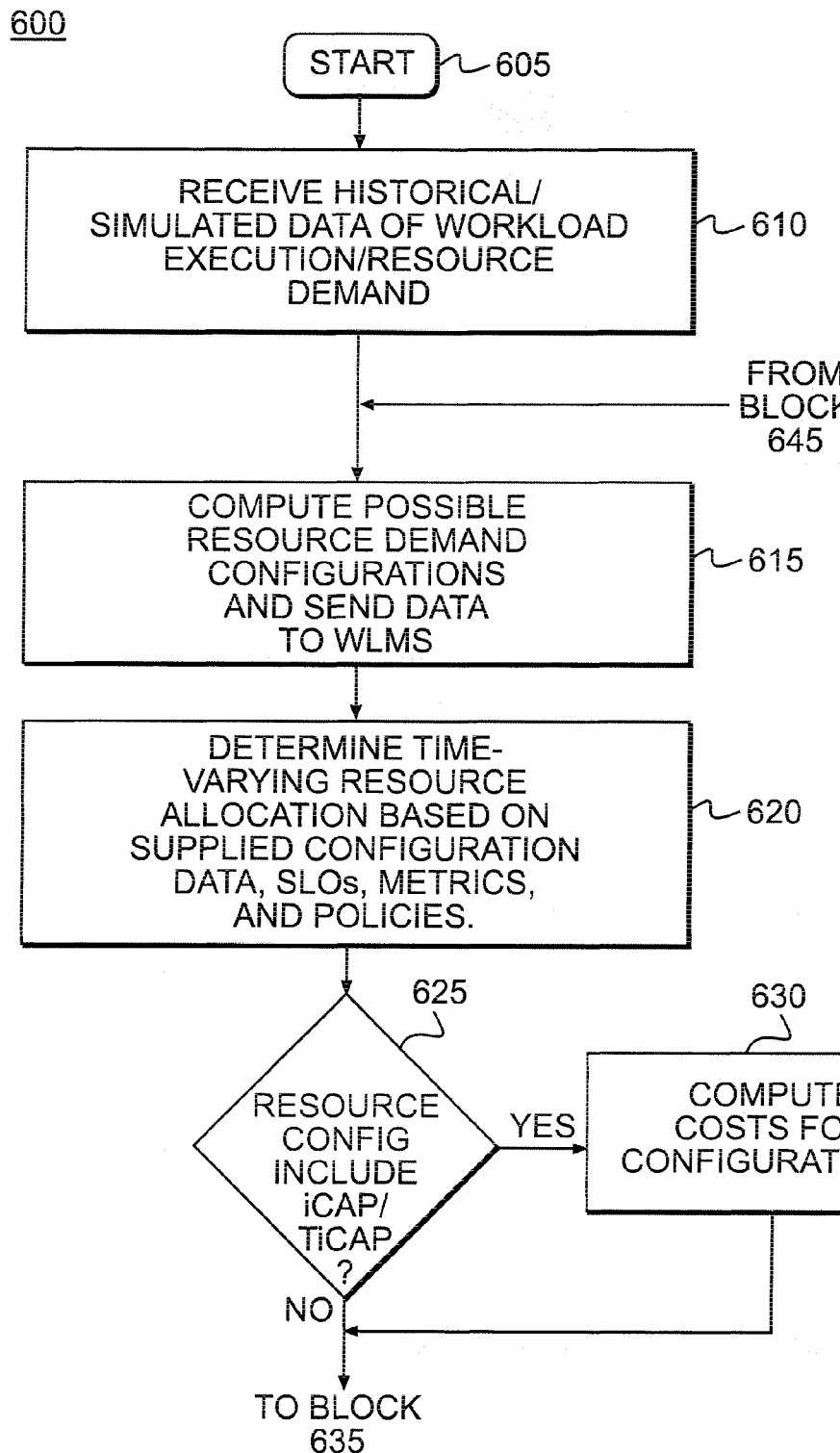
FIGS. 4A and 4B are flowcharts illustrating an exemplary operation of the integration architectures of FIGS. 2 and 3.

FIGS. 4A and 413 are flowcharts illustrating an exemplary operation 600 of the integration architectures 100 and 400. The operation 600 begins in FIG. 4A, block 605, with the computer system 10 in operation and with the CPS 300 and WLMS 200 having established historical data for workload execution and corresponding resource allocation. In block 610, the simulation module 130 is provided with either or both historical data related to workload execution and resource demand and allocation, or simulations of the same, or a combination of historical and simulated data. The data may be provided by the computer system administrator by way of interface 310, or the data may be extracted from databases 240 and/or 330.

In block 615, the simulation module 130 computes possible resource demand configurations and sends the configuration data to the WLMS 200, and more specifically to the modeling module 140. In block 620, the modeling module 140 determines the time-varying resource allocation options based on the supplied configuration data, taking into account SLOs, performance metrics, and policies.

Figure 4B:
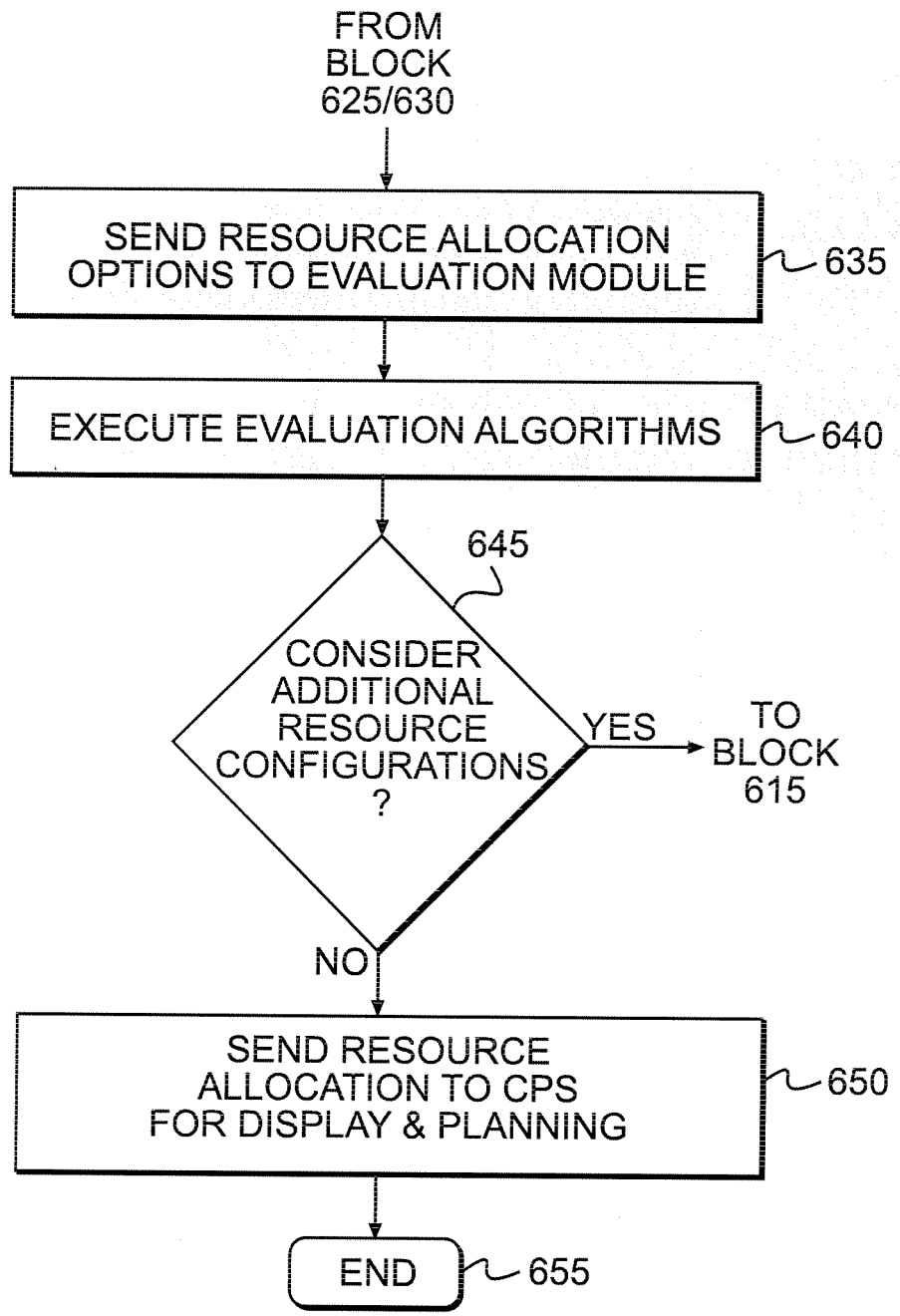

In block 625, the modeling module 140 determines if the resources available for allocation include any instant capacity resources. If instant capacity resources are included in the resource configuration data, then the modeling module 140 also computes (block 630) the costs associated with each possible resource allocation option. Following either block 625 or 630, the operation 600 moves to block 635 (FIG. 4B) and the modeling module 140 sends the resource allocation options to the evaluation module 160. In block 640, the evaluation module 160, using evaluation algorithms, determines if am, of the projected resource allocation configuration options meets specified criteria, threshold conditions, or performance objective, and what the desirability of each of the configuration options is. If none of the configuration options achieves a sufficient desirability ranking, or if only a subset of the configuration options achieves a stated desirability value (block 645), the evaluation module 160 may direct the simulation module 130 to create additional resource configurations for modeling in the WLMS portion of the integration architecture 100, in which case the operation 600 returns to block 615. The evaluation module 160 alternatively, or in addition, may provide a notification of this condition to the computer system administrator. If the desirability rankings of the configuration options meets the stated thresholds, criteria, and objectives, the operation 600 moves to block 650 and the configuration options are sent to the feedback module 320 and the interface 310 of the CPS 300 for formatting and display to the computer system administrator. In block 655, the operation 600 ends.

The above-described interaction (e.g., the operation 600) between the CPS 300 and the WLMS 200, as made possible by the integration architecture 100 may proceed in at least two distinct ways. First, in a batch process, the CPS portion of the integration architecture 100 (the simulation module 130) sends all the resource configuration data and all operating data (i.e., data for numerous management intervals) to the WLMS portion of the integration architecture 100, which then would return a block of data comprising the entire expected operating results. Second, in an interactive process, the CPS portion of the integration architecture 100 first establishes a resource configuration and provides operating data for a single management interval to the WLMS portion of the integration architecture 100. The modeling module 140 then processes the data and returns the resulting resource allocation configuration options to the evaluation module 160. The simulation module 130 then provides the next interval, and so on, with the operation 600 executing in a ping-pong fashion as long as required by the evaluation module 160.

The various disclosed embodiments may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from a long-term storage media of some type, such as semiconductor, magnetic, and optical devices, including a removable disk or a hard drive. The code may be distributed on such media, or may be distributed to network operators from the memory or storage of one computer system over a network of some type to other computer systems for use by operators of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

We claim:

1. A system comprising:
   a processor; and
   a computer readable storage medium having encoded thereon a program of instructions for integrating resource capacity planning and workload management, that when executed by the processor, causes the processor to:
   access a simulation module to receive simulation data related to execution of the workloads, resource types, numbers, and capacities, the resource types including full usage rights resources and limited usage rights resources, wherein full usage rights resources are those for which the computer system has full rights, wherein limited usage rights resources are instant capacity resources and temporary instant capacity resources, and generate one or more possible resource configuration options;
   access a modeling module to receive the resource configuration options and determine, based on one or more specified criteria, one or more projected resource allocations among the workloads; and
   access a communications module to receive the projected resource allocations and present the projected resource allocations for review by a user.

2. The system of claim 1, wherein the one or more specified criteria include service level objectives, performance metrics, and workload-resource allocation policies.

3. The system of claim 1, wherein the processor accesses the modeling module to compute resource costs for each of the one or more projected resource allocations.

4. The system of claim 1, wherein the processor accesses an evaluation module, wherein the one or more resource allocation projections are evaluated according to a specified standard, and wherein execution of the evaluation module causes the processor to:
   receive directions for modeling of additional resource configuration options;
   notify the user when the specified standard is not achieved by one or more of the one or more resource allocation projections; and
   receive directions for varying policy settings and evaluating the effect of the variance on the one or more resource allocation projections.

5. The system of claim 1, wherein the resource allocation projections are time-varying.

6. The system of claim 1, wherein the system is implemented as part of a workload management system and part of a capacity planning system.

7. A method, implemented on a suitably programmed computing device, for integrating capacity planning and workload management, comprising:
   receiving simulated data related to usage of resources, the resource including full usage rights resources and limited usage rights resources, wherein full usage rights resources are those for which the computing device has full rights, wherein limited usage rights resources are instant capacity resources and temporary instant capacity resources, by executing workloads;
   computing possible resource demand configurations based on the received simulated data;
   sending the resource demand configurations to a workload management system;
   determining, at the workload management system, resource allocation options; and
   sending the resource allocation options to a capacity planning system for display to a user.

8. The method of claim 7, further comprising:
   extracting, from a configuration file, policies, performance metrics, and service level objectives for the workloads; and
   using the extractions, determining the resource allocation options.

9. The method of claim 7, wherein the method is performed in an interactive basis.

10. The method of claim 9, wherein the receiving, computing, and sending the resource demand configurations are executed for a first management interval, and one or more subsequent management intervals.

11. The method of claim 7, wherein the resource allocation options are time-varying.

12. The method of claim 7, further comprising:
    determining if any of the resource demand configurations include instant capacity resources, wherein costs associated with the instant capacity resources are computed; and
    sending the costs to the capacity planning system for display to the user.

13. A system for integrating capacity planning functions and workload management functions in a computing system, the architecture, comprising:
    a processor; and
    a computer readable storage medium having encoded thereon an architecture comprising a program of instructions that when executed by the processor, cause the processor to:
    receive simulation data related to execution of the workloads, resource types, numbers, and capacities, the resource types including full usage rights resources and limited usage rights resources, wherein full usage rights resources are those for which the computing system has full rights, wherein limited usage rights resources are instant capacity resources and temporary instant capacity resources;
    generate one or more possible resource configuration options based on the received data;
    model resource configuration options including determining, based on one or more specified criteria, one or more projected resource allocations among the workloads; and
    communicate the projected resource allocations to a user.

14. The system of claim 13, wherein the one or more specified criteria include service level objectives, performance metrics, and workload-resource allocation policies.

15. The system of claim 10, wherein the processor computes resource costs for each of the one or more resource allocation projections.

16. The system of claim 13, wherein the resource allocation projections are time-varying.

17. The system of claim 13, wherein the architecture is implemented as part of a workload management system and part of a capacity planning system.

18. The system of claim 17, wherein the service level objectives, performance metrics, and workload-resource allocation policies are stored in a configuration file of the workload management system.

* * * * *